Patented Dec. 11, 1945

2,390,918

UNITED STATES PATENT OFFICE 2,390,918

γ-NITRO MONOCARBOXYLIC ESTERS

Herman A. Bruson, Philadelphia, Pa., assignor to The Resinous Products & Chemical Company, Philadelphia, Pa., a corporation of Delaware No Drawing. Application December 28, 1943, Serial No. 515,977

6 Claims. (Cl. 260—478)

This invention relates to condensation products of acrylic acid esters and mononitroalkanes having a reactive hydrogen-bearing carbon atom contiguous to the nitro group.

Although it has been known that sodium nitroalkanes react with certain unsaturated ketones to form metallic derivatives from which the nitro group may disappear on further treatment, and although it has been reported that these same ketones and some esters react with nitroalkanes to form complex products when an alkaline agent was used in catalytic amounts, it has not heretofore been known that nitroalkanes react with lower alkyl esters of acrylic acid in the presence of a small amount of an alkaline condensing agent to form simple, well-defined compounds. Nor has it been known heretofore that these two components could be reacted in simple ratio of one mol to one mol to form γ-nitro alkyl esters of fatty acids, which are of great utility in the synthesis of more complicated organic structures.

According to this invention nitroalkanes having one nitro group and a reactive hydrogen-bearing carbon atom contiguous to the nitro group are reacted with acrylic acid esters in the presence of an alkaline condensing agent to replace one or more of the active hydrogen atoms of said reactive group by an esterified β-carboxyethyl radical.

The reaction takes place readily with the mononitroalkanes. Of particular interest for the purpose because of their availability are the following: Nitromethane, nitroethane, 1-nitropropane, 2-nitropropane, the nitrobutanes, and higher homologues thereof.

As alkaline condensing agents, there may be mentioned the oxides, hydroxides, amides, hydrides, or alcoholates of the alkali metals, the alkali metals themselves, and strongly basic nonmetallic hydroxides, such as quaternary ammonium hydroxides. These may be employed in inert solvents or suspending agents for the reactants as, for example, dioxane, benzene, or ether, or in media less reactive than the nitro compounds, such as tertiary butanol. The more stable alkalies, such as sodium hydroxide, potassium hydroxide, trimethyl benzyl ammonium hydroxide, dimethyl dibenzyl ammonium hydroxide, and the like, can be used in aqueous solution for the purpose.

The quantity of alkaline condensing agent used is small, amounts of the order of 0.5 to 10% on the weight of the reactants usually being sufficient. The condensation occurs readily at temperatures between about 0° and about 80° C., preferably from about 30° to 60° C., and is often exothermal so that cooling is advantageous in order to prevent undesired side reactions. Depending upon the number of available reactive hydrogen atoms on the carbon atoms contiguous to the nitro group, one or more

groups can be introduced, R being the organic radical of a monohydric alcohol. This organic radical may be aliphatic, aryl, aralkyl, cycloalkyl, or heterocyclic.

The products are useful as insecticides and as intermediates for the preparation of amino acids, amino alcohols, nitro-acids, and nitro amides for use in the preparation of synthetic resins, plasticizers, and drugs.

The following examples illustrate this invention:

Example 1

A mixture consisting of 44.5 grams of 2-nitropropane, 25 cc. of tertiary butanol, and 5 grams of aqueous 40% trimethyl benzyl ammonium hydroxide was stirred while 50 grams of ethyl acrylate was added dropwise thereto during one hour. The reaction temperature was maintained between 35° and 40° C. by external cooling. The mixture was stirred thereafter for five hours at 25°-30° C. and then made acidic to litmus by the addition of a slight excess of dilute hydrochloric acid. The product was then mixed with an equal volume of ethylene dichloride and washed several times with water. The washed ethylene dichloride layer was then evaporated to dryness under reduced pressure at 90°-95° C. The residue was a blue oil weighing 91 grams. Upon distillation in high vacuo, it boiled at 89°-90° C./1 mm. The yield was 78 grams of a pale blue oil ($d_4^{25}$ 1.0774 and $N_D^{25}$ 1.4383) which, upon standing, became pale green. Its formula is:

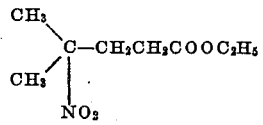

Example 2

Forty-three grams of methyl acrylate was added dropwise to a mixture of 44.5 grams of 2-nitropropane, 25 cc. of dioxane, and 5 grams of aqueous 40% trimethyl benzyl ammonium hydroxide while the reaction mixture was stirred and cooled to 35°-40° C. The mixture was stirred thereafter for six hours, then acidified with dilute hydrochloric acid and thoroughly washed with water. Upon distillation in vacuo, γ-methyl-γ-nitro-methyl valerate came over at 85°–90° C./1–2 mm. as a pale bluish-green oil in 86% of the theoretical yield. The compound has the formula:

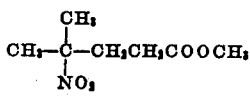

Example 3

To a well stirred mixture of 44.5 grams of 1-nitropropane (0.5 mol), 5 grams of aqueous 40% trimethyl benzyl ammonium hydroxide in 15 cc. of tertiary butanol there was added during 45 minutes, while the temperature of the reaction mixture was held at 35°–40° C., 50 grams of ethyl acrylate (0.5 mol). At this point, five grams of additional aqueous 40% trimethyl benzyl ammonium hydroxide was added, followed by the dropwise addition of another 50-gram portion of ethyl acrylate during 45 minutes. After all had been added, the mixture was stirred for six hours at 25°–30° C. It was then acidified with dilute hydrochloric acid, taken up in ethylene dichloride, and washed thoroughly with water. The ethylene dichloride layer was separated and evaporated to dryness in vacuo on a steam bath. The residual oil, weighing 112 grams, was distilled in high vacuo. Two fractions were obtained, one boiling at 90°–91° C./1 mm. as a colorless oil, consisting of γ-nitro-ethyl hexoate.

$$CH_3CH_2CH(NO_2)CH_2CH_2COOC_2H_5$$

and the other consisting of γ-nitro-γ-ethyl-pimelic acid diethyl ester

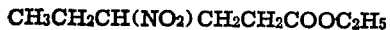

distilling at 160°–164° C./1 mm. as a pale yellow oil.

Example 4

Fifty grams of ethyl acrylate (0.5 mol) was added dropwise to a stirred solution of 19 grams of nitroethane (0.25 mol), 3 grams of aqueous 40% trimethyl benzyl ammonium hydroxide, and 10 cc. of tertiary butanol at 35°–40° C. The mixture was then stirred for six hours at 25° C., acidified with dilute hydrochloric acid, taken up in ethylene dichloride, and thoroughly washed with water. The ethylene dichloride layer was separated and evaporated to dryness at 85° C. under reduced pressure (50 mm.). The residual oil, weighing 62 grams, was distilled in high vacuo.

The desired γ-methyl-γ-nitro-diethyl pimelate distilled over at 154°–155° C./1 mm. as a faintly bluish-green oil in a yield of 41 grams. Its formula is

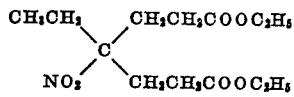

Example 5

Eighty-six grams of methyl acrylate was added dropwise to a stirred solution of 37.5 grams of nitroethane, 50 grams of dioxane, and 3 grams of aqueous 40% trimethyl benzyl ammonium hydroxide while the reaction mixture was cooled to 35°–40° C. After all the methyl acrylate had been added during the course of 75 minutes, the mixture was stirred for six hours and then acidified with dilute hydrochloric acid. The oil was taken up in ethylene dichloride, washed thoroughly with water, and distilled in vacuo. The desired γ-methyl-γ-nitro-dimethyl pimelate (90 grams) came over at 153°–155° C./1 mm. as an almost colorless oil; $N_D^{25}$ 1.4589; $d_4^{25}$ 1.1879.

Example 6

Methyl acrylate (86 grams) was added dropwise during a period of one and one-half hours to a stirred solution of 61 grams of nitromethane, 60 cc. of dioxane, and 7 grams of aqueous 40% trimethyl benzyl ammonium hydroxide while the reaction mixture was maintained at 30°–37° C. by external cooling. The mixture was stirred thereafter for five hours at 25°–30° C. and then made faintly acid toward litmus with dilute hydrochloric acid. The product was mixed with an equal volume of ethylene dichloride, and then washed thoroughly with water. The ethylene dichloride layer was separated and distilled under reduced pressure. The main fraction distilled at 160°–170° C./1 mm. as a pale green oil. The yield was 48 grams. This consisted essentially of γ-nitro-dimethyl pimelate:

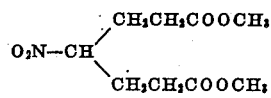

The residue (35 grams) consisted of an oil having the composition:

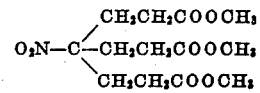

It could not be distilled in vacuo at 1 mm. without decomposition.

Example 7

To a stirred mixture of 450 grams of nitroethane, 50 grams of tertiary butyl alcohol, and 25 grams of 40% trimethyl benzyl ammonium hydroxide, heated to 40° C., there was added gradually 258 grams of methyl acrylate during the course of two hours while the reaction mixture was maintained at 40°–45° C. After all of the methyl acrylate had been added, stirring was continued for four hours at room temperature. The mixture was then neutralized with dilute hydrochloric acid, washed twice with water, and the washed oil dried in vacuo. There was a yield of 268 grams of crude product. This was distilled in vacuo, yielding a distillate identified as methyl-γ-nitrovalerate

which came over as a pale yellow oil at 85°–90° C./1 mm. in a yield of 212 grams.

Upon redistillation, this compound was obtained in a pure form as a colorless oil, which boiled at 106°–107° C./9 mm.

Example 8

To a stirred solution of 366 grams of nitromethane, 50 grams of tertiary butyl alcohol, and 25 grams of 40% trimethyl benzyl ammonium hydroxide, there was gradually added 258 grams of methyl acrylate during the course of three hours while the temperature remained at 20° C. The mixture was then stirred for three hours at room temperature, neutralized with dilute hydrochloric acid, and washed several times with water.

Unchanged nitromethane and methyl acrylate were distilled off at atmospheric pressure and the residual oil fractionally distilled in vacuo. The desired methyl-γ-nitrobutyrate distilled over at 85°–95° C./1 mm. as a colorless liquid. Upon redistillation, the pure product, $$O_2NCH_2CH_2CH_2COOCH_3$$

boiled at 109° C./9 mm.

In the above examples, the methyl acrylate or ethyl acrylate can be replaced mol for mol by any other esters of acrylic acid to yield the corresponding esters of nitro fatty acids. For example, one may use the propyl, butyl, amyl, isoamyl, octyl, dodecyl, cetyl, oleyl, methallyl, allyl, chloroethyl, methoxyethyl, ethoxyethyl, butoxyethyl, phenoxyethyl, tert.-butylphenoxyethyl, phenyl, chlorophenyl, benzyl, o-chlorobenzyl, cyclohexyl, tetrahydrofurfuryl, dimethylaminoethyl, dimethylaminopropyl, or other ester of acrylic acid.

It has been found that proportions of nitroalkane to acrylic ester may be so chosen that the formation of the alkyl γ-nitro monocarboxylates or nitro derivatives having a single esterified β-carboxyethyl substituent is favored. The resulting compounds are of the general formula:

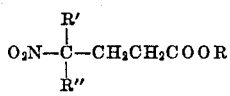

wherein R' and R'' are hydrogen or alkyl groups and R is an alkyl radical. Those compounds in which R is a lower alkyl group of one to six carbon atoms are of particular interest, for these are readily prepared and are most useful as intermediates in complicated chemical syntheses.

This application is a continuation-in-part of application Serial No. 402,630, filed July 16, 1941.

I claim:

1. As a new compound, an ester of the formula:

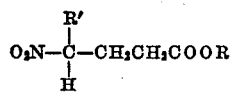

wherein R' and R represent lower alkyl groups.

2. As a new compound, an ester of the formula:

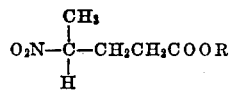

wherein R is a lower alkyl group.

3. As a new compound, an ester of the formula:

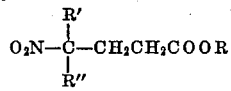

wherein R' and R'' are selected from members of the class consisting of hydrogen and lower alkyl groups and R is a lower alkyl group.

4. As a new compound, methyl γ-nitrovalerate:

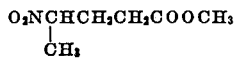

5. As a new compound, methyl γ-methyl-γ-nitrovalerate:

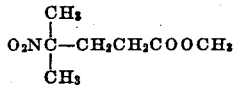

6. As a new compound, ethyl γ-nitrohexoate:

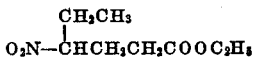

HERMAN A. BRUSON.